Patented Nov. 3, 1942

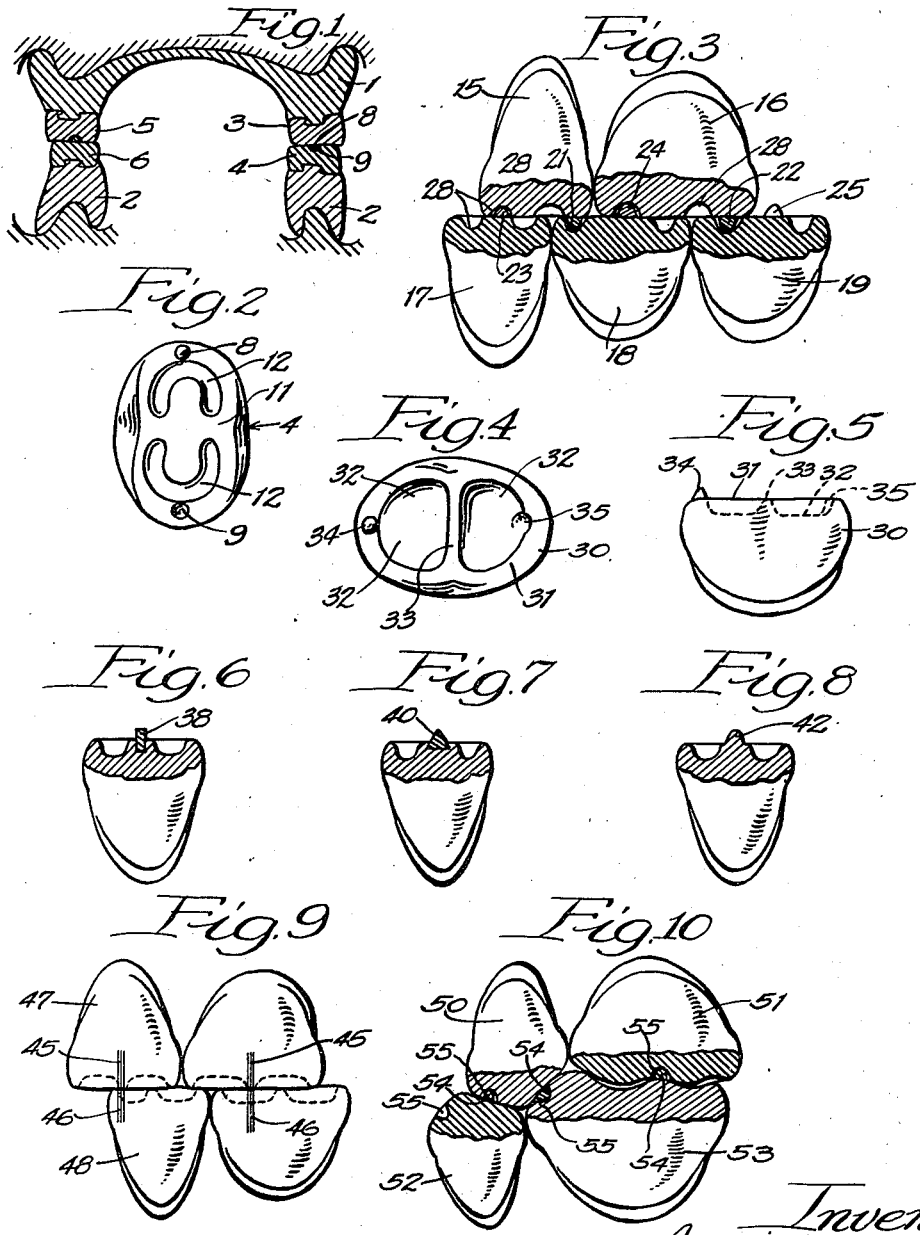

2,300,577

UNITED STATES PATENT OFFICE 2,300,577

ARTIFICIAL TOOTH

John B. La Due and Jacob A. Saffir, Chicago, Ill.

Application February 10, 1939, Serial No. 255,680

13 Claims. (Cl. 32—8)

This invention relates to artificial teeth and more particularly the posterior teeth.

It is an object of the present invention to provide artificial teeth with means facilitating the correct positioning of cooperating upper and lower teeth in a denture.

In the mounting of upper and lower cooperating teeth in a denture there are many ways in which the teeth can be set wrong, but only one correct setting. Artificial anatomical teeth have heretofore been provided with mesial and distal marginal ridges so located in the teeth that they might frequently serve also as landmarks for the correct positioning of the teeth. However, the utilization of these ridges as landmarks for the correct mounting of the teeth requires considerable time and great skill, and even then there is no assurance that the teeth are set correctly in all respects.

It is an object of this invention to provide artificial teeth, both anatomical and mechanical, with indexing means or landmarks other than the usual anatomical cusps or ridges, for facilitating correct positioning of the teeth. An anatomical tooth is one which has carvings and an external anatomical surface shape similar to that of a natural tooth. A mechanical tooth is one having on occlusal surface suitable for crushing and no distinct cusps of the type found on natural teeth, although it may have some depressions on the occlusal surface. It is a further object of this invention to provide aligning landmarks which are distinctly noticeable and of such shapes as to require a minimum of skill in the proper alignment of the teeth. It is a still further object of the present invention to provide landmarks of such shape and location that misalignment of the teeth is instantly discernible.

Another object of this invention is the provision of removable landmarks for facilitating correct alignment of artificial teeth. This overcomes the serious limitations as to the permissible shape of the landmarks where the landmarks are later to perform anatomical or dental functions.

It is a further object of the present invention to provide landmarks for facilitating the correct mounting of posterior teeth with respect to a pair of opposite teeth. By this construction one tooth in the lower plate, for instance, secures the proper alignment of two adjacent teeth of the upper plate, and one of these two teeth of the upper plate secures the proper alignment of another adjacent tooth of the lower plate. There is thus obtained the proper alignment of cooperating opposite teeth as well as of adjacent teeth.

In accordance with the principles of one preferred embodiment of the present invention the aligning means consists of cooperating male and female elements adapted to interengage when, and only when, the teeth are in proper relative positions. The female landmark may comprise a portion of the occlusal area and the male landmark may comprise a temporary projection made of suitable easily removable material. When the cooperating landmarks engage, the teeth are in proper position in the dentures. When the plates are inserted into a patient's mouth the dentist is quickly apprised if the teeth are properly aligned, for if they are not properly aligned the male landmark prevents closure of the jaws. After proper alignment is secured, the male landmark can be easily removed.

The attainment of the above and further objects of the present invention will be apparent from the following specification taken in conjunction with the accompanying drawing forming a part thereof.

In the drawing:

Figure 1 is a sectional view of a set of upper and lower plates positioned within the human mouth, said view being taken through certain posterior teeth;

Figure 2 is a plan view of one of the teeth of Figure 1;

Figure 3 is a diagrammatic fragmentary sectional view through a group of posterior teeth, illustrating the manner of aligning the respective teeth;

Figure 4 is a plan view of a tooth illustrating an alternate indexing means;

Figure 5 is an elevation of the tooth illustrated in Figure 4;

Figures 6, 7 and 8 are elevational views, in partial section, illustrating alternate indexing means for mechanical posterior teeth;

Figure 9 is a diagrammatic view showing adjacent upper and lower posterior teeth having still other indexing means for facilitating mounting thereof; and Figure 10 is a view corresponding to Figure 1 and illustrating the principles of the present invention as applied to artificial anatomical teeth.

Reference may now be had more particularly to Figure 1. In this figure there is illustrated an upper dental plate 1 and a lower dental plate 2 having cooperating posterior teeth 3—4 and 5—6. The posterior teeth here illustrated are mechanical teeth, although the invention is equally applicable to anatomical teeth, as will be apparent as this description proceeds. The teeth are mounted in the respective plates in any desired manner, as is known in the art. The upper and lower teeth have cooperating landmarks for facilitating correct positioning of the occlusal surfaces of the teeth. The landmarks in the embodiment illustrated in Figure 1 comprise a male prong or projection 8 extending from the occlusal surface of the tooth 3 and adapted to enter an opening 9 in the tooth 4. The projection 8 and the opening 9 are so positioned with respect to the respective occlusal surfaces of the two teeth that when the teeth are positioned with the male and female landmarks in engagement the occlusal surfaces are properly positioned mesially, distally, lingually, buccally and vertically. Each tooth 3 and 4 has both a male projection and a female opening, as is illustrated in Figure 2. In this figure the occlusal surface of the tooth 4 is indicated at 11, said surface preferably, but not necessarily, having the well known grooves 12 customary in certain types of mechanical teeth, for facilitating the functioning of the teeth. In addition to the grooves 12 the tooth 4 has the male projection 8 extending from the occlusal surface 11 at one end of the tooth and has a corresponding opening 9 for receiving the projection 8 of the upper tooth. The opening 9 is a counterpart of the projection 8, so that the projection 8 can enter an opening 9 only if the corresponding teeth are in proper angular relationship. If one tooth is improperly inclined with respect to the other, inter-engagement between corresponding members 8—9 can not be effected. When the teeth are properly positioned the projections 8 of the teeth are opposite the openings 9 of the opposite row of teeth, so that if the two dentures are brought together the mating landmarks are in engagement or in mesh. However, if the occlusal surfaces are not correct the projection and indentation will not fit and the occlusal surfaces can not be approximated.

The positioning of adjacent teeth and proper indexing thereof is illustrated in Figure 3 in connection with a somewhat different form of indexing means. In this figure 15 indicates an upper second bicuspid, 16 an upper first molar, 17 a lower second bicuspid, 18 a lower first molar, and 19 a lower second molar. The teeth 15, 16, 17, 18 and 19 have landmarks 21, 22, 23, 24 and 25, respectively, said landmarks comprising projections extending from the occlusal surfaces of the respective teeth and constituting the male prong of the cooperating interengaging indexing means. The female part of the indexing means comprises a portion of the marginal grooves 28 in the occlusal surfaces of the respective teeth. When the teeth are positioned as illustrated in Figure 3, with the landmarks 21 to 24 positioned within the cooperating grooves in the opposite teeth, the occlusal surfaces of the teeth are in proper alignment. If any tooth is not in proper alignment it will fail to receive the projection of an opposite tooth or its projection will fail to enter the groove of the opposite tooth. This causes a very evident opening between the occlusal surfaces which can only be corrected when the occlusion is correct.

In the making of artificial dentures, such as upper and lower plates, the dentist follows the usual procedure of first taking impressions of the jaws, making models thereof, mounting these on an articulator to reproduce as nearly as possible the relationship of the upper and lower jaws, and then properly mounting wax rims on the articulator preparatory to the placing of the preformed artificial teeth in the rims, all as known in the art. With the rims in the articulator it is then a comparatively easy matter to mount the artificial teeth of the present invention in the rims, and readily shift the positions of the teeth until the landmarks or indexing means on the upper and lower teeth are opposite one another so that it is possible to effect movement of the articulator corresponding to closure of the jaws. When the landmarks or indexing means are properly engaged there is no space between the occlusal surfaces and therefore there is correct occlusion. The dentist can then complete the making of the dentures in the usual manner. When the completed dentures are first placed in the patient's mouth the dentist has a ready means for ascertaining if the teeth are properly positioned. If the positioning is improper then the landmarks will not be opposite one another, or will not be in proper angular relationship. It will not be possible for the patient to bring the posterior teeth into occlusion if one male landmark can not slide into its cooperating groove. If the patient can bring the posterior teeth into occlusion the dentist knowns that the teeth are properly positioned in all respects. He can then remove the male projections 21 to 25 inclusive. To facilitate such removal the projections are preferably made of material different from that of the tooth as, for instance, of hard wax, vulcanite, or soft metal that can be readily ground away or quickly worn away in the normal mastication. However, they can be made of porcelain which is easy to grind away.

In Figures 4 and 5 there is illustrated another type of mechanical tooth. The tooth, indicated at 30, has an occlusal surface 31 including depressions 32 and a ridge 33. The landmarks for facilitating positioning of this tooth with respect to its adjacent posterior teeth comprise a male projection 34 of readily removable material, as above set forth, and a slight projection-receiving depression 35 at one end of the groove 32 for receiving the male projection of an adjacent tooth.

In the bicuspid of Figure 6 a small pin 38 of gold, platinum alloy encased in gold, or other suitable metal is formed in the tooth and adapted to extend into an opening shaped to receive the same, in the opposite tooth, it being understood that each tooth has both a projection and an opening. After the teeth have been properly positioned the dentist must grind the projection 38 down to the level of the occlusal surface of the tooth or, if the projection is made of soft material, it may be pulled out or otherwise dislodged.

At 40 in Figure 7 there is illustrated another type of male projection which is applicable to any of the teeth previously described. This male projection or indexing means may comprise a small piece of vulcanite or other baked-in plastic material, such as any of the phenol resin or vinol resin series, or may comprise a button of cement, plaster, hard wax, or the like. This projection can be easily ground down after it has served its purpose as a landmark. Should the dentist fail to grind it down it will be quickly worn away during the natural course of mastication.

In Figure 8 we have shown a tooth wherein the male landmark, indicated at 42, is in the form of a baked-in protuberance which is part of the material of the tooth itself and is adapted to be ground down after it has served its purpose as a landmark.

In each of the teeth of Figures 6, 7 and 8 there are two landmarks, namely a projection and a projection-receiving groove.

In Figure 9 we have shown, diagrammatically, teeth of any well known type, having landmarks 45—46 which are in alignment when the teeth, such as 47 and 48, are in proper relative position. The landmarks 45—46 may comprise straight lines on the outer surface of each tooth, in the form of a slight protuberance on each tooth, the protuberances being of the same color as the enamel of the teeth. If desired each line landmark 45—46 may consist of a colored line drawn on the enamel of the tooth, which line can be washed away or polished off after it has served its purpose as a landmark. If desired the landmark may be in the form of a piece of tape or paper glued to the tooth and bearing the lines 45—46 for matching corresponding teeth, which piece of tape or paper can be easily removed after it has served its purpose as a landmark.

In Figure 10 we have shown the principles of the present invention as applied to anatomical teeth. In this figure 50 represents an upper second bicuspid, 51 an upper first molar, 52 a lower second bicuspid and 53 a lower first molar. Each tooth has a landmark 54 in the form of a projection and 55 in the form of a projection-receiving groove. The projection of one tooth enters the groove of another, as illustrated in Figure 10. The projections may be of any of the materials heretofore described so that it may be readily removed or ground away and thus not interfere with the anatomical functioning of the teeth. Since the projection is to have no anatomical function it may be located at any desired place on the tooth, determined only by the position of a suitable projection-receiving opening on the opposite tooth.

While most of the teeth above described have two landmarks each, it is within the province of the present invention to provide a single landmark on each tooth, as in Figure 9. Also, each posterior tooth of the upper (or lower) set may have one or more projections each adapted to enter a corresponding groove or female landmark in the opposite set of posterior teeth.

In compliance with the requirements of the patent statutes we have here shown a few preferred embodiments of the present invention. It is, however, to be understood that the invention is not limited to the precise construction here shown, the same being merely illustrative of the principles of the invention. What we consider new and desire to secure by Letters Patent is:

1. An artificial tooth having an occlusal surface and a removable aligning landmark comprising a projection extending from and beyond the occlusal surface.

2. Artificial posterior upper and lower teeth adapted to be mounted in cooperating relationship and having cooperating occlusal surfaces and in addition to the occlusal surfaces having landmarks comprising a removable projection on one of the teeth and a projection receiving opening on the other tooth.

3. In combination, upper and lower artificial teeth having occlusal surfaces and adapted to be mounted in relative cooperating relationship, and cooperating aligning means on the teeth in addition to the occlusal surfaces for facilitating alignment of the teeth to bring the occlusal surfaces into proper relative positions and comprising a removable projection extending from and beyond the occlusal surface of one tooth and adapted to enter a recess in a cooperating tooth, said projection being removable after assembly of the teeth and prior to continuous use thereof.

4. A set of upper and lower dentures each having cooperating posterior teeth positioned therein, the posterior teeth having cooperating occlusal surfaces, and cooperating indexing means for facilitating correct relative positioning of cooperating occlusal surfaces, said indexing means on at least one of the teeth being in addition to the occlusal surface of said tooth.

5. A pair of cooperating teeth having cooperating occlusal surfaces and male and female aligning landmarks, the male landmark comprising a removable projection extending from one tooth in addition to the occlusal projections on said one tooth, and the female landmark being a counterpart of the male landmark and adapted to receive the male landmark only when the teeth are in exactly proper angular relationship for proper occlusion with one another.

6. Means for aligning an artificial posterior tooth with respect to two opposite posterior teeth, comprising a pair of landmarks on said first mentioned tooth, and said opposite teeth having each a landmark which is a counterpart of one of the landmarks of said first mentioned tooth and is adapted to telescopically engage one of said first mentioned landmarks only when the teeth are in proper angular positions so that when they are brought together they are in proper occlusion, one of each of the telescoping landmarks comprising a protuberance extending from and beyond the occlusal surface of its tooth.

7. An artificial tooth having an occlusal surface and a removable landmark comprising a projection extending from and beyond the occlusal surface and of material different than the material forming the occlusal surface to facilitate removal of the landmark.

8. Artificial cooperating upper and lower teeth having means for facilitating proper relative alignment thereof comprising removable projections on certain of the teeth and counterparts of the projections on the opposite teeth in such relative locations that the projections enter the counterparts only if the teeth are in relative positions to effect proper occlusion and the projections prevent even approximate relative cooperative closure of the teeth when the teeth are out of position for proper occlusion, said projections extending from and beyond the occlusal surfaces of the teeth and being removable.

9. An artificial tooth having an occlusal surface and a plurality of aligning landmarks at least one of which landmarks comprises a removable projection extending from and beyond the occlusal surface.

10. Artificial posterior upper and lower teeth adapted to be mounted in cooperating relationship and having cooperating occlusal surfaces and in addition to the occlusal surfaces having aligning landmarks, there being at least two landmarks on each tooth and each landmark cooperating with a landmark on an adjacent tooth to constitute a pair of cooperating landmarks, one landmark of each pair of cooperating landmarks comprising a removable projection and the cooperating landmark of the pair comprising a projection receiving opening.

11. In the dental art a method of making a set of cooperating upper and lower dental members which comprises locating teeth with landmarks in such relative positions that when the landmarks on adjacent teeth are in alignment the corresponding teeth are in proper relative positions, with the landmarks as guides mounting the teeth in position with the landmarks in alignment, and then removing the landmarks before the occlusal surfaces of the teeth are put to use in the mouth.

12. In the dental art the method of making a set of cooperating upper and lower dental members which comprises positioning teeth with projections on certain of the teeth and counterparts of the projections on opposite teeth in such relative locations that the projections enter the counterparts only if the teeth are in positions to effect proper occlusion, and the projections prevent even approximate closure of the dental members when the teeth are not in position for proper occlusion, mounting the teeth in position and with the projections adapted to enter the counterparts, and then removing the projections.

13. Artificial posterior upper and lower teeth having cooperating occlusal surfaces and in addition to the occlusal surfaces having aligning landmarks in such relative locations that they are in alignment when the teeth are in position for proper occlusion.

JOHN B. LA DUE.
JACOB A. SAFFIR.